United States Patent [19]

Coquard et al.

[11] 4,387,184
[45] Jun. 7, 1983

[54] HEAT STABLE POLYPHASE POLYAMIDE COMPOSITIONS AND PREPARATION THEREOF

[75] Inventors: Jean Coquard, Grezieu la Varenne; Jean Goletto, Ecully, both of France

[73] Assignee: Rhone-Poulenc Industries, Paris, France

[21] Appl. No.: 213,666

[22] Filed: Dec. 5, 1980

[30] Foreign Application Priority Data

Dec. 10, 1979 [FR] France ................................ 79 30648
Mar. 5, 1980 [FR] France ................................ 80 05272

[51] Int. Cl.³ ............................................. C08L 77/00
[52] U.S. Cl. ...................................... 525/183; 525/66; 525/92; 525/420.5; 525/432
[58] Field of Search ...................... 525/432, 420.5, 66, 525/92, 183; 260/18 N

[56] References Cited

U.S. PATENT DOCUMENTS 2,824,848  2/1958  Witcoff .............................. 525/432
3,645,932  2/1972  Harrison ............................ 525/432
3,839,245 10/1974  Schlossmar ...................... 260/18 N
4,062,819 12/1977  Mains ................................. 525/432

FOREIGN PATENT DOCUMENTS 740501  8/1966  Canada .............................. 525/183
45-12234 5/1970  Japan ................................. 525/432

Primary Examiner—Paul Lieberman
Attorney, Agent, or Firm—Burns, Doane, Swecker & Mathis

[57] ABSTRACT

Provided are heat-stable polyphase polyamido compositions having improved mechanical properties which comprise (i) from 50 to 99% by weight of a nylon polyamide resin matrix and (ii) from 1 to 50% by weight of a particulate disperse phase comprising a polyamide incompatible with the polyamide resin matrix, and methods for the preparation thereof. Shaped articles comprising said compositions exhibit improved physical properties, particularly with regard to impact strength.

22 Claims, No Drawings

HEAT STABLE POLYPHASE POLYAMIDE COMPOSITIONS AND PREPARATION THEREOF

BACKGROUND OF THE INVENTION

1. Field of the Invention:

The present invention relates to novel polyamide-based compositions having improved properties of impact strength, ductility and crystallinity, together with markedly enhanced heat stability. The present invention also relates to processes for preparing such compositions.

2. Description of the Prior Art:

Unmodified polyamides which possess high break strengths are considered to be tough polymers. In contrast, same are typically rather lacking or deficient as regards cracking and resistance to the propagation of cracks, which is the result of a certain sensitivity to chipping or notching and, possibly, of breakage due to embrittlement. This tendency to break as a result of being brittle rather than ductile substantially limits the uses of such polyamides and their reliability.

Improvement in the impact strength of thermoplastic polyamides has been studed in detail and numerous solutions to the problem have been proposed. Thus, British Pat. No. 998,439 features a composition comprising a mixture of 50 to 99% of a linear polyamide and 1 to 50% of an olefinic copolymer containing from 0.1 to 10 mol percent of acid functions, dispersed in the polyamide in the form of particles having a diameter of less than 5 microns.

U.S. Pat. Nos. 3,388,186 and 3,465,059 feature mixtures of polycaproamide and olefin copolymers containing from 1 to 20 mol % of (meth)acrylic acids or derivatives thereof, onto which an aminoacid has been grafted.

U.S. Pat. No. 3,668,274 describes mixtures of polyamides and 2.5 to 30% of a multiphase polymer comprising carboxyl functions, consisting of a first elastomeric phase (50 to 99.9% of an alkyl acrylate and butadiene) onto which a more rigid copolymer, containing from 1 to 50% by weight of an unsaturated carboxylic acid, has been grafted.

U.S. Pat. No. 3,845,163 describes mixtures of 60 to 80% by weight of a polyamide and 15 to 40% by weight of an α-olefin copolymer containing from 1 to 8 mol % of an α,β-ethylenic carboxylic acid in which at least 10% of the acid functions have been neutralized by metal ions.

French Pat. No. 2,311,814 features a very large number of multiple-phase polyamide compositions having improved toughness, which consist of mixtures produced in the molten state from 60 to 99% by weight of a polyamide and 1 to 40% by weight of at least one other phase containing particles of at least one polymer having a modulus under traction of less than 1/10 of that of the polyamide, which "adheres" to the polyamide and the particle size of which is between 0.01 and 3 microns. The polymers which can be used as the disperse phase are chosen from among the non-crosslinked, linear or branched thermoplastic or elastomeric polymers belonging to the following chemical families:

(i) Copolymers of unsaturated monomers and molecules which generate adherent sites, such as: carbon monoxide, carboxylic acids with α,β-ethylenic unsaturation, or derivatives thereof, unsaturated epoxides and residues of an aromatic sulfonylazide substituted by carboxylic acids;

(ii) Polyurethanes derived from polyester-glycols or polyether-glycols; and (iii) Polyether network polymers obtained by reacting epoxide monomers.

The majority of the polymeric additives mentioned or noted in the prior art have a relatively low thermal or chemical stability, and this limits their use in the field of conventional polyamides, in which the conditions of preparation or processing are very harsh. Thus, the polyurethanes and polyether network polymers described in French Pat. No. 2,311,814, supra, can reasonably be used only in conjunction with matrices having melting points below 200°–220° C.

The very large number of copolymers of olefins and acrylic derivatives described in the prior art also undergo very substantial decomposition when they are mixed in the molten state with polyamides having a high melting point, such as, for example, polyhexamethylene adipamide.

The use of polyamides which exhibit good heat stability as a reinforcing phase for thermoplastic compositions comprising a polyamide matrix, has not been heretofore described. Mixtures of conventional polyamides or copolyamides, among which may be mentioned without limitation, polycaprolactam, polyhexamethylene adipamide, polyhexamethylene sebacamide, polyhexamethylene dodecanamide and their copolymers, in fact have a well-known chemical instability in the molten state which is due to the existence of exchange reactions between the different types of amide sequences. It is thus not generally possible to obtain, in the molten state, a stable dispersion of particles of a polyamide or copolyamide in another polyamide since such a system inevitably changes rapidly into a homogeneous copolyamide initially formed of polyamide blocks, which themselves change with moderate rapidity into a statistical copolyamide.

Polyamide additives which have been used to modify other polyamides, generally for purposes other than that of creating stable multiphase compositions, are found in the prior art. U.S. Pat. No. 3,645,932 claims the nucleation of polyamides derived from polymeric fatty acids by means of 0.1 to 10% by weight of a nucleating agent, which can be another polyamide having a high melting point and possessing a high tendency to crystallize.

U.S. Pat. No. 4,062,819 features mixtures of thermoplastic polyamides possessing improved rheological and flow properties which comprise from 80% to 99.99% by weight of a polyamide resin and from 0.01% to 20% by weight of a polyamide additive which has an amine number of less than 3 and is prepared by reacting an aliphatic or cycloaliphatic diacid having from 18 to 52 carbon atoms and a saturated aliphatic diacid having from 2 to 13 carbon atoms, which can represent up to 30% by weight of the acids, with a stoichiometric amount of one or more saturated aliphatic diamines having from 2 to 10 carbon atoms. The aforedescribed polyamide additives have relatively high melting points and are essentially compatible with the base polyamide resins. The resulting polyamide mixtures, besides improved flow properties possess a slightly greater flexibility and a crystallization rate which is not significantly lower than that of the matrix when the proportion of additive does not exceed 10% by weight. The impact strengths of these compositions, however, are not significantly greater than the impact strengths of the base polyamides. Indeed, in the case of polyamide-6,6, the impact strength is reduced by 14% when the composition comprises 2% by weight polyamide additives. Moreover, in the case of polyamide-6, the impact strength increases by 9.5% with 2% by weight additives, but drops to 15.5% below that of the base resin with 10% by weight additives.

SUMMARY OF THE INVENTION

Accordingly, a major object of the present invention is the provision of novel polyamide-based polyphase compositions which have improved physical properties and are particularly stable at high temperature, such compositions being characterized in that they essentially consist of 50 to 99% by weight of a matrix-forming phase, which is a polyamide resin, and from 1 to 50% by weight of a disperse phase comprising a polyamide which is incompatible with the polyamide matrix resin. Preferably, the matrix-forming phase has a number-average molecular weight of at least 5,000, while the disperse phase is particulate in form with the particles having a size ranging from $0.001\mu$ to $100\mu$, and more preferably a size ranging from $0.01\mu$ to $10\mu$, and either wholly or partially consisting of a polymer selected from among the polyamides having a proportion of amide groups of less than 20%, and more preferably less than 40%, of that of the matrix-forming polyamide resin, and having a glass transition temperature below 5° C., and more preferably below −10° C.

In a preferred embodiment, the polyphase compositions of matter comprise from 55 to 99% by weight of a polyamide matrix resin and from 1 to 45% by weight of the particulate disperse phase.

In another embodiment of the invention, particular processes for preparing the aforedescribed compositions are provided.

By the term "polyphase composition" there is intended a composition consisting of at least two phases which remain differentiated both in the solid state and in the molten state. A distinction is drawn between the main phase or matrix and the reinforcing phase or phase which is dispersed in the matrix.

By the expression "essentially consist of", there is intended that, in addition to the matrix-forming polyamide resin and the disperse phase or phases, other constituents can be present in the composition, provided that the essential characteristics of said composition are not substantially modified by these constituents.

By the expression, for example, "at least one other disperse phase in the form of particles having a size of between 0.01 and 10 microns", there is intended that at least one disperse phase in the form of particles having a maximum size of 0.01 to 10 microns, based on polyamide as defined herein, is present in the composition. A certain minor proportion of one or more other polymers in the form of particles of 0.01 to 10 microns can also be present.

By the expression "either wholly or partially consisting of a polymer selected from among polyamides . . . ", there is intended that one or more polyamides as defined herein constitute the disperse phase, which can also contain a certain proportion of other polymers, provided that the essential characteristics of the composition are not impaired.

This other polymer or these other polymers in a minor proportion, which may be present in the disperse phase in addition to the polyamide disperse phase, may consist of reinforcing polymers, such as those described in the aforesaid prior art patents.

DETAILED DESCRIPTION OF THE INVENTION

More particularly, the matrix-forming polyamide resin in the compositions according to the invention is a resin well known to the prior art and includes the semi-crystalline and amorphous resins having a molecular weight of at least 5,000 and commonly referred to as nylons. The polyamides which can be used include those described in U.S. Pat. Nos. 2,071,250, 2,071,251, 2,130,523, 2,130,948, 2,241,322, 2,312,966, 2,512,606 and 3,393,210. The polyamide resin can be prepared by condensing equimolar amounts of a saturated dicarboxylic acid containing from 4 to 12 carbon atoms, with a diamine, the diamine containing from 4 to 14 carbon atoms. It is possible to employ an excess of diamine so as to obtain an excess of amine end groups relative to the carboxyl end groups in the polyamide, or to employ an excess of diacid so as to obtain an excess of carboxyl end groups relative to the amine end groups in the polyamide.

In order to be able to control the molecular weight of the polymers obtained, a chain terminator is typically employed. This chain terminator is used in an amount which depends on the desired molecular weight range. However, from 0.1 to 2 mol %, relative to the salts is generally employed.

The chain terminators can be selected from the group comprising carboxylic acids and aliphatic amines. Examples of polyamides include polyhexamethylene adipamide (nylon-6,6), polyhexamethylene azelamide (nylon-6,9), polyhexamethylene sebacamide (nylon-6,10) and polyhexamethylene dodecanamide (nylon-6,12), polyamides produced by the ring opening of lactams, namely, polycaprolactam and poly-(lauryllactam), poly-(11-aminoundecanoic acid) and poly-bis-(para-aminocyclohexyl)-methane dodecanamide. In the present invention, it is also possible to use polyamides prepared by the copolymerization of two of the above polymers or by the terpolymerization of the above polymers or their constituents, for example, a copolymer of adipic acid, isophthalic acid and hexamethylenediamine. Preferably, the polyamides are linear and have a melting point above 200° C.

The polyamides constituting the reinforcing phase or phases dispersed in the matrix are linear, branched or crosslinked polyamides or copolyamides. In the last instance, the crosslinking must be such that the glass transition temperature (Tg) is not above 5° C., and it must have been carried to allow for the achievement of a particle size in accordance with the invention. A process for the easy production of a composition comprising a crosslinked disperse phase is described infra.

Linear polyamides or copolyamides which can be used as the dispersed phase can be obtained by the polycondensation of lactams or mixtures of lactams, diacids and diamines, or mixtures of diacids and diamines. The diacids or diamines used can optionally contain in their chain one or more hetero-atoms, such as, for example, oxygen (in which case an ether or polyether linkage is obtained), sulphur (in which case a thio or polythio linkage is obtained), or nitrogen (in which case an imine or polyimine linkage is obtained). They can also optionally contain one or more double bonds.

Branched or crosslinked polyamides or copolyamides which can be used as dispersed phases can be prepared from reactants which are of the same type as those used for the linear polyamides or copolyamides, provided part of same consists of molecules having at least three reactive functions of identical or different types. As it is preferred that the polyamides according to the invention have a content in amide groups of less than 40% of the amide groups comprising the polyamide matrix resin, they should be prepared using monomers at least one of which has a molecular weight at least 2.5 times greater than the average molecular weight of the monomers employed for the polyamide matrix resin. Exemplary reactants, being nowise limitative and keeping in mind that the choice of reactant depends upon the selected matrix, include polymeric diacids and/or diamines, and polyether-diamines or -diacids.

Long-chain diacids and diamines of high molecular weight can be used in accordance with the invention and can be aliphatic or cycloaliphatic, and preferably, contain more than 18 carbon atoms. The chains can be linear, or optionally, have alkyl branches.

In the case of essentially linear polyamides or copolyamides, the dicarboxylic acids used industrially can contain small amounts of monoacids and/or polyacids; however, the proportion of diacids should be greater than 80%. The dicarboxylic acids of particular interest for purposes of the invention are acids obtained by dimerizing fatty acids having from 16 to 26 carbon atoms, such as oleic, linoleic, linolenic or oleostearic acids, or mixtures thereof. The diacids obtained by dimerizing C18 acids, such as oleic or linoleic acid or a mixture thereof, are of particular value.

Dimeric acids inevitably contain a certain proportion of monocarboxylic acid or polymeric acids, the latter being predominantly trimeric acids. It is preferred, however, to use dimeric acids having a proportion of dimer greater than 90% by weight.

Similarly, the diamines used industrially can contain a certain percentage of monoamine and/or polyamine. The polyamines of particular interest for purposes of this invention are polyamines having from 32 to 60 carbon atoms, which can be prepared from dimers of fatty acids having from 16 to 26 carbon atoms, and which can contain a certain proportion of monomeric amine and/or polymeric amine, the latter being predominantly trimeric amine. It is preferred, however, to use dimeric diamines having a proportion of dimer which is greater than 90% by weight.

In the case of branched or crosslinked polyamides or copolyamides, which can be valuable in certain instances, examples of reagents having at least three reactive groups and which can be used to prepare said polyamides or copolyamides include:

(i) Triamines, such as bis-hexamethylenetriamine, or the trimeric amines obtained from the trimer of a fatty acid having from 16 to 26 carbon atoms;

(ii) Triacids, such as the trimers of a fatty acid having from 16 to 26 carbon atoms; 1,2,4-benzenetricarboxylic; 1,3,5-benzenetricarboxylic acid; tetracarboxylic acids, such as 1,2,4,5-benzenetetracarboxylic acid, and the like; and, (iii) Unsaturated acids, and more particularly unsaturated diacids such as itaconic acid. In the latter instance, the crosslinking is achieved by polymerizing the double bonds, which generally requires the presence of initiators or unsaturated comonomers.

The polyamides employed in the reinforcing phase or disperse phase do not contain sequences of functional groups obtainable by condensation reactions other than amide sequences.

The other polymers which can comprise the disperse phases of the compositions according to the invention are advantageously those polymers which are totally or partially miscible, within a temperature range of between 20° C. and 300° C., with the polyamides used for the disperse phase. The polymers having this characteristic and bearing functional groups which are reactive towards the polyamides are of particular value as agents for crosslinking the polyamides used as the reinforcing phase according to the invention.

The compositions according to the invention can of course be modified by one or more typical additives, such as stabilisers and inhibitors of degradation by oxidation, by ultraviolet radiation or light, or by heat; lubricants and mold-release agents; colorants comprising dyestuffs and pigments; fibrous and particulate fillers and reinforcements; nucleating agents; plasticizers; and the like.

The stabilizers, for example, can be incorporated into the composition at any stage of the preparation of the thermoplastic composition. Preferably, the stabilizers are included fairly early in order to prevent degradation from starting before the composition can be protected. These stabilizers must be compatible with the composition.

The oxidation and heat stabilizers which can be used in the compositions of the present invention include those generally used in polyamides. They include, for example, up to 1% by weight, relative to the weight of the polyamide, of halides of group I metals, for example, sodium, potassium and lithium; with copper halides, for example, the chloride, the bromide and the iodide; sterically hindered phenols, hydroquinones and various substituted members of these groups and combinations thereof.

The ultraviolet stabilizers, which are present, for example, in a proportion ranging up to 2%, relative to the weight of polyamide, can also be those normally used with polyamides. Examples which may be mentioned are various substituted resorcinols, salicylates, benzotriazoles, benzophenones and the like.

Lubricants and mold-release agents which can be used, for example, in a proportion ranging up to 1.0% relative to the weight of the composition, are stearic acid, stearyl alcohol and stearylamides; organic dyestuffs and pigments, for example, titanium dioxide, carbon black and the like, can be used in proportions ranging up to 5% by weight.

The fibrous or particulate fillers and reinforcements, for example, carbon fibers, glass fibers, amorphous silica, asbestos, calcium silicate, aluminum silicate, magnesium carbonate, kaolin, chalk, powdered quartz, mica, feldspar and the like, can be present in proportions ranging up to 50%, relative to the weight of the composition, insofar as the desired mechanical properties are not substantially impaired.

The compositions can also contain nucleating agents, for example, talc, calcium fluoride, sodium phenylphosphinate, alumina and finely divided polytetrafluoroethylene, and the like; and plasticizers, in proportions ranging up to about 20%, relative to the weight of the composition, for example, dioctyl phthalate, dibenzyl phthalate, butyl benzyl phthalate, hydrocarbon oils, N-n-butylbenzenesulphonamide, ortho- and paratoluene-ethylsulphonamides and the like.

In another aspect of the present invention, processes for the preparation of the polyamide-based multiphase compositions according to the invention are provided.

Generally, the compositions of the invention can be prepared by mixing in a closed system a matrix-forming polyamide resin, preferably from 55 to 99% by weight, relative to the mixture of polymers, of a polyamide resin having a number-average molecular weight of at least 5,000, and more preferably greater than 10,000, and a disperse phase polyamide, preferably from 1 to 45% by weight, relative to the mixture of polymers, of one or more reinforcing polymers of which at least 20% by weight consists of a polyamide having a glass transition temperature below 5° C. and a content in amide groups of less than 40% of the amide groups comprising said polyamide matrix resin, at a temperature exceeding the melting point of the polyamide matrix resin and under shear conditions sufficient to disperse the reinforcing polymers in the matrix resin in particulate form, preferably as particles having dimensions of between 0.01 and 10 microns. The reinforcing or disperse phase polyamide can be linear or slightly crosslinked and the number-average molecular weight of the reinforcing polyamide should be greater than 5,000, and preferably greater than 15,000.

In determining sufficient shear conditions, one must consider the melting point of the polyamides present and their melt viscosity at the working temperature, for the shear conditions depend, inter alia, on said factors. The duration of the shear operation can be influenced by the shearing equipment, e.g., by the number of screws, the profiles of the screws, the separation from the barrel of the extruder, and the like. Optimum conditions are determined experimentally.

In a modified embodiment of the aforedescribed process, from 55 to 99% by weight, relative to the mixture of polymers, of a matrix-forming polyamide resin having a number-average molecular weight ranging from 2,000 to 10,000, and from 1 to 45% by weight of one or more reinforcing polymers of which at least 20% by weight consists of a polyamide having a number-average molecular weight greater than 5,000, and preferably greater than 15,000, are mixed at a temperature exceeding the melting point of the polyamide matrix resin in a system which permits degassing under shear conditions sufficient to result in the dispersion of the disperse phase in the matrix as particles having dimensions of between 0.01 and 10 microns, with the disperse phase polyamide having a glass transition temperature below 5° C. and a content in amide groups of less than 40% of the amide groups comprising the polyamide matrix resin. Accordingly, the dispersion of the reinforcing polymer or polymers and the completion of the polycondensation of the matrix polyamide are thus carried out conjointly.

As in the aforedescribed process, it is difficult to specify the shear conditions "in abstracto", due to the many factors one must consider, i.e., suitable shear conditions depend not only on the nature and the relative amounts of the matrix-forming polymer and of the polymer or polymers used as the reinforcing phase, but also on the working temperature and the equipment. The factor which can be varied most easily, of course, is the duration of the operation, but this must be sufficient to ensure completion of both the polycondensation of the polyamide matrix resin and the dispersion of the reinforcing or disperse phase.

Another modified embodiment of the process finds particular value if the constituents of the reinforcing or disperse phase polyamide, namely the polyamine, the polyacid or their salts, are incompatible with the constituents of the matrix polyamide. The process comprises mixing the primary constituents (diamine, diacid and/or salts), or the oligomers, having a molecular weight of less than 5,000, of the polyamide used as the matrix and of the reinforcing polyamide, in a system permitting the polycondensation of the polyamides. The polycondensation is carried out to completion in accordance with the processes normally employed for the preparation of matrix-forming polyamides, however, the equipment used is fitted with a stirrer permitting the mutual dispersion of the two phases. The nature and the amount of the constituents of the reinforcing polyamide are to be chosen so that the polyamide obtained from these constituents has a glass transition temperature below 5° C. and a content in amide groups of less than 40% of the amide groups comprising the polyamide matrix resin.

The operating conditions employed should be such as to sufficiently permit both the dispersion and polycondensation to be completed satisfactorily.

In another embodiment, a process is provided which finds particular value if the reinforcing polymer is soluble, at a temperature below about 200° C., in the primary constituents or oligomers of the matrix-forming polyamide. The reinforcing polyamide, having a molecular weight of more than 5,000, and preferably of more than 15,000, is dissolved in the primary constituents or oligomers of the matrix polyamide, and the polycondensation of the matrix polyamide is completed while stirring is continued, accordingly. What results is a precipitation of the reinforcing polyamide as a disperse phase as the molecular weight of the matrix polyamide increases. The reinforcing polyamide employed must have a glass transition temperature below 5° C. and a content of amide groups of less than 40% of that of the polyamide matrix resin.

As is self-evident from the aforegoing descriptions of the process and its modified embodiments, it is not possible to use just any process with any matrix and any reinforcing phase. A judicious choice must be made which depends on the nature of the various constituents, their respective proportions and the desired properties of the final composition.

The reinforced thermoplastic compositions can facilely be converted into a wide variety of useful shaped articles by means of conventional compression-molding or extrusion-molding techniques typically used in the manufacture of thermoplastic articles, such as molded pieces, extruded products, for example, tubes, films, sheets, fibers and oriented fibers, laminates, and wire coverings and coatings.

The compositions according to the invention are characterised by a notable combination of properties, the most important of which being a remarkable toughness, taking into account the amount of reinforcing polymer present in the polyamide matrix and its tendency to crystallize. This toughness, which can be exceptionally high, provides for a high ductility and a greatly reduced sensitivity to notching as originating from molding.

This combination of properties, and particularly the elasticity, even at low temperature, makes it possible to use the subject compositions in a very large number of applications, in particular in the fields of mechanics, aviation, automotive, electronics and tools.

In order to further illustrate the present invention and the advantages thereof, the following specific examples are given, it being understood that same are intended only as illustrative and in nowise limitative.

In the following examples, a certain number of determinations were carried out on the primary constituents or the polyamides resulting therefrom. Likewise, various properties of the compositions were measured. The procedures or specifications in accordance with which the aforesaid determinations or analyses were carried out are set forth below.

1. Measurement of the pH of dilute solutions of dimeric acid/hexamethylenediamine (HMD) salt A RADIOMETER PHM 62 pH meter equipped with a combined glass/calomel electrode was used. The measurements were carried out at 20° C.

The apparatus was calibrated using two buffer solutions at pH 7 and 9, spanning the pH corresponding to the equivalence point of the dimeric acid/HMD salt.

The salt was prepared as a 50% strength solution in a 50/50 by weight mixture of water and isopropanol and the pH was determined by bringing the salt concentration to 10% in the same solvent mixture.

The pH was adjusted to within ±5/100 of a pH unit of the value corresponding to the equivalence point (namely, 8.75).

2. Conditioning of the polymers at EH O

Reinforcing phases: the reinforcing phases were dried in an oven at ambient temperature under a vacuum of 0.5 to 1 mm of mercury, over $P_2O_5$, for 24 hours.

Matrices: the polymers used as the matrix were dried in an oven at 110° under 0.5 to 1 mm of mercury for 15 hours.

The molded test-pieces were placed in a desiccator over silica gel and dried for an additional 24 hours at ambient temperature under 0.5 to 1 mm of mercury before carrying out the measurements.

3. Flexural modulus at EH O and 23° C.

This determination was carried out on injection-molded 80×10×4 mm bar-type test-pieces in accordance with ISO Recommendation R 178.

4. Notch impact strength

The CHARPY notch impact strength was measured in accordance with ISO Recommendation R 179.

The determinations were carried out on molded bars having the following dimensions: length=50±0.1 mm; width=6±0.2 mm; thickness=4±0.2 mm; length of the notch=0.8±0.1 mm; thickness under the notch=2.7±0.2 mm.

A ZWICK impact meter was used at 23° C., the test-pieces having been conditioned at EH O.

The result is expressed in Joules/$cm^2$.

5. Determination of end groups $NH_2$: Automatic potentiometric determination of the solution of polymer in a 90/10 by weight mixture of phenol and water, using HCl. The result is given in gram equivalents per $10^6$ g of polymer.

COOH: Hot dissolution of the polymer in benzyl alcohol, under a nitrogen atmosphere, and acidimetric determination of this hot solution, under nitrogen, using a glycolic solution of potassium hydroxide in the presence of phenolphthalein. The result is given in gram equivalents per $10^6$ g of polymer.

6. Determination of inherent viscosity

The dried polymer was dissolved in meta-cresol to give an 0.5% strength solution. The flow time of this solution was measured in comparison with that of the pure solvent. The value of the inherent viscosity is given by the formula:

$\eta inh = 4.6 (\log t_1 - \log t_o)$
$t_1$ = flow time of the solution
$t_o$ = flow time of the solvent

7. Microcalorimetric analysis

The polymers or the mixtures of polymers are characterized by their intrinsic viscosity and also by the melting and crystallization characteristics, such as the melting point, Mp, and the crystallization point on cooling, CpC, the difference between the two constituting the supercooling $\Delta$ which characterizes nucleation. Another crystallization characteristic, which is essentially related to the crystallite growth rate, is based on the determination of Tg $\alpha$, $\alpha$ being the angle formed by the horizontal of the base line with the initial part of the peak of the crystallization exotherm on cooling under strict conditions of observation, the horizontal of the base line and the peak of the crystallization exotherm being determined from the curve obtained from the differential microcalorimetric analysis of the sample studied.

These determinations were carried out on a sample subjected to both increasing and decreasing temperature variations of 10° C./minute.

The improvement in the crystallization of the compositions according to the invention can be assessed either by the decrease in $\Delta$, compared with the coefficient $\Delta$ of the polyamide matrix, or also by the increase in tg $\alpha$, which characterizes the acceleration of crystallite growth.

8. Glass transition temperature

The glass transition temperature corresponds to the sudden drop in the shear modulus as a function of the temperature. It can be determined from the graph representing the variations in the torsional modulus as a function of the temperature, these variations being measured by thermomechanical analysis using an automatic torsion pendulum.

The characteristics of the two matrices used in the following examples are not specified:

| A. Polyhexamethylene adipamide: | |
|---|---|
| $\eta$inh: | 1.173 dl/g |
| COOH end groups: | 66.07 |
| $NH_2$ end groups: | 45.83 |
| Notch impact strength: | 0.56 ± 0.05 J/$cm^2$ |
| Flexural modulus: | 240 ± 20 daN/$mm^2$ |
| Tg by thermomechanical analysis: | 55° |
| Mp: | 260° C. CpC = 210° C. $\Delta$ = 50° C. |
| tg $\alpha$ = 17 | |
| Proportion of amide groups per 100 g: | 0.885 |
| B. Polycaprolactam: | |
| $\eta$inh: | 1.263 dl/g |
| COOH end groups: | 45.7 |
| $NH_2$ end groups: | 35.16 |
| Notch impact strength: (stabilized at 100° C.) | 0.616 ± 0.04 J/$cm^2$ |
| Flexural modulus: (stabilized at 100° C.) | 248 ± 8 daN/$mm^2$ |
| Tg by thermomechanical analysis: | 41° C. |
| Mp = 225° C. CpC = 173° C. $\Delta$ = 52° C. | |
| tg $\alpha$ = 28.5 | |

| | |
|---|---|
| Proportion of amide groups per 100 g: | 0.885 |

EXAMPLE 1

Preparation of polycondensates with low proportions of amide groups, for reinforcing phases:

(1) Preparation of the polyamide of dimeric acid and hexamethylenediamine (polymer 1):

1.1. Preparation of stoichiometric mixture of dimeric acid and hexamethylenediamine:

The following ingredients were introduced into a 3 liter reactor which was fitted with a propeller stirrer, adapted to provide a nitrogen atmosphere and was also fitted with a 500 ml dropping funnel and a tap enabling the drawing off of samples from the base thereof:

| | |
|---|---|
| Fatty acid dimer having a monomer content of 0.03% and a trimer content of about 3% (marketed under the name Empol 1010 by Unilever Emery) | 500 g |
| Isopropanol | 300 g |

The mixture was homogenized and the free volume of the reactor was purged with nitrogen. 100 g of pure hexamethylenediamine, dissolved in 300 g of previously softened or deionized water were then uniformly added to the stirred mass over the course of about one hour.

The resulting limpid solution was homogenized for 30 minutes.

A small sample of about 10 cm$^3$ was taken and was diluted with a water/isopropanol mixture (50/50 by weight) so as to bring the salt concentration to 10%. The value of the pH of this dilute solution was less than that of the pH at the equivalence point.

1.6 g of a 50% strength solution of hexamethylenediamine in the water/isopropanol mixture (50/50 by weight) were introduced into the concentrated solution. The solution was homogenized for 30 minutes and a further pH measurement in dilute solution was then carried out. The value of the pH of the dilute solution reached that of the pH at the equivalence point (8.67) to within plus or minus five hundredths of a pH unit. A stoichiometric solution of dimeric acid and hexamethylenediamine was thus obtained.

1.2. Preparation of the polyamide:

800 g of the stoichiometric solution of dimeric acid and hexamethylenediamine were introduced into a 1 liter autoclave fitted with a stirring system (scraping anchor stirrer rotating at 10–50 rpm), a distillation column (height: 40 cm, $\phi$ internal: 2.5 cm-multiknit packing) and a system making it possible to purge and sweep the autoclave with nitrogen. The autoclave was purged 3 times by applying a pressure of 6 bars of nitrogen, this being followed by decompression to atmospheric pressure. The reaction mass was then heated gradually, under stirring (50 rpm), with a slow nitrogen sweep. The solvents were distilled uniformly over the course of 90 minutes by raising the temperature of the mass from 90° C. to 180° C. The mass was then heated to 270° C. over the course of one hour. Stirring was reduced to 10 rpm and the mass was maintained at 270° C. for two hours. The mass, continuously stirred at 270° C., was placed under a vacuum of 10 mm Hg over the course of 45 minutes and the vacuum was maintained for 30 minutes. The stirring was stopped, the vacuum was broken under nitrogen and the polymer was extruded from the autoclave, under a pressure of 5 bars of nitrogen, into a water-cooling trough.

The resulting polymer, which was transparent and very slightly yellow-colored, possessed the following characteristics:

| | |
|---|---|
| Mp determined by differential microcalorimetry: | 86° C. |
| Tg by thermomechanical analysis = | −20° C. |
| COOH groups = | 69.8 |
| NH$_2$ groups = | 6.8 |
| Flexural modulus at EH O 23° C. = | 18 DaN/mm$^2$ |
| Proportion of amide groups per 100 g: | 0.305 |

EXAMPLE 2

Preparation of the polyamide of dodecamethylenediamine and dimeric acid:

2.1. Preparation of stoichiometric mixture of dimeric acid and dodecamethylenediamine:

The equipment described in Example 1 was used.

The following ingredients were introduced into the reactor:

| | |
|---|---|
| Fatty acid dimer having a monomer content of 0.03% and a trimer content of 3% (marketed under the name Empol 1010 by Unilever Emery) | 571 g |
| Water/isopropanol (50/50 w/w) | 771 g |
| Dodecamethylenediamine (origin: HULS) | 200 g |

The dimeric acid and the 50/50 solution of water and isopropanol were introduced into the reactor and the mixture was homogenized by stirring under nitrogen. The dodecamethylenediamine was added in small portions over the course of 1 hour, under stirring. Stirring was continued for 30 minutes after the addition of the solution was completed and the solution was then perfectly limpid and homogeneous.

A sample of about 10 cm$^3$ was taken and was diluted with a 50/50 by weight mixture of water and isopropanol so as to bring the salt concentration to 10%. The value of the pH of this solution was greater than that corresponding to the equivalence point. 5.7 g of Empol 1010, dispersed in water/isopropanol (5.7 g), were then added and the solution was again homogenized for 30 minutes. A further pH measurement in dilute solution was carried out. The value of the pH of the dilute solution reached that of the pH at the equivalence point (8.54) to within ±0.05 of a pH unit. A stoichiometric solution of Empol 1010 and dodecamethylenediamine was thus obtained.

2.2. Preparation of the polyamide:

The equipment described in Example 1 was used. 800 g of the stoichiometric solution of dimeric acid and dodecamethylenediamine were introduced into the autoclave. The procedure described in paragraph 1.2 was then followed. The resulting polymer was transparent and slightly yellow-colored and it possessed the following characteristics:

| | |
|---|---|
| Mp by differential microcalorimetry: | 86° C. |
| Tg by thermomechanical analysis: | −15° C. |
| COOH groups: | 57.15 |
| NH$_2$ groups: | 8.73 |
| Inherent viscosity: | 0.661 dl/g |
| Torsional modulus at 20° C.: | 8.5 DaN/mm$^2$ |

-continued

| | |
|---|---|
| Proportion of amide groups per 100 g: | 0.27 |

EXAMPLE 3

Preparation and properties of the polyamide of 1,10-diamino-4,7-dioxadecane and dimeric acid:

3.1. Preparation of stoichiometric mixture of dimeric acid and 1,10-diamino-4,7-dioxadecane:

The equipment described in Example 1 was used.
The following ingredients were introduced into the reactor:

| | |
|---|---|
| Fatty acid dimer having a monomer content of 0.03% and a trimer content of 3% (marketed under the name Empol 1010 by Unilever Emery): | 571 g |
| Water/isopropanol (50/50 w/w) | 747 g |
| 1,10-Diamino-4,7-dioxadecane: | 176 g |

The dimeric acid and the 50/50 solution of water and isopropanol were introduced into the reactor and the mixture was homogenized by stirring under nitrogen. 176 g of 1,10-diamino-4,7-dioxadecane were added over the course of 1 hour. The mixture was stirred for an additional 20 minutes after the addition was completed. A sample of about 10 cm³ was then taken and was diluted with the 50/50 mixture of water and isopropanol in order to bring the salt concentration to 10%. The value of the pH of this solution was greater than that corresponding to the equivalence point. 3 g of Empol 1010, dispersed in 3 g of the 50/50 mixture of water and isopropanol, were then added. The solution was again homogenized for 30 minutes. The pH was checked in a 10% strength dilute solution and the value of the pH of this solution reached that of the pH of the equivalence point (8.61) to within ±0.05 of a pH unit. A stoichiometric solution of dimeric acid and 1,10-diamino-4,7-dioxadecane was thus obtained.

3.2. Preparation of the polyamide:

The equipment described in Example 1 was used. 820 g of the stoichiometric solution of dimeric acid and 1,10-diamino-4,7-dioxadecane were introduced into the autoclave. The procedure described in paragraph 1.2. was then followed. The resulting polymer was transparent and slightly yellow-colored and it possessed the following characteristics:

| | |
|---|---|
| Tg by thermomechanical analysis: | −30° C. |
| COOH groups: | 58 |
| NH₂ groups: | 19.80 |
| Inherent viscosity: | 0.512 dl/g |
| Torsional modulus at 20° C.: | 1.4 DaN/mm² |
| Proportion of amide groups per 100 g: | 0.28 |

EXAMPLE 4

Preparation and properties of the polyamide of dimeric diamine and dimeric acid:

The reaction was carried out in a stirred Pyrex reactor equipped with a nitrogen circulation system. 20 g of dimeric diamine, having an amine number of 195–205 and an iodine number of 10–20 (VERSAMINE 52, from General Mills Chemical Inc.), and 20.60 g of dimeric acid (Empol 1010) were introduced at ambient temperature.

The mixture was stirred at ambient temperature under nitrogen. The temperature was raised to 270° over the course of 1 hour and this temperature was maintained for 1 hour, under stirring. A reaction mass having a high viscosity upon completion of the reaction was thus obtained and a very slight yellow coloration was observed. The polymer possessed the following characteristics:

| | |
|---|---|
| No sharp Mp determined by differential microcalorimetry | |
| Tg determined by differential microcalorimetry: | −30° C. |
| Inherent viscosity: | 0.55 dl/g |
| Proportion of amide groups per 100 g: | 0.182 |

The modulus of this product was approximately equal to that of the previous polyamide.

EXAMPLE 5

Preparation and properties of the polyamide prepared from hexamethylenediamine (HMD), bis-hexamethylenetriamine (BHMTA) and dimeric acid:

The reaction was carried out in a 1 liter glass reactor with a stainless steel anchor stirrer. The apparatus was equipped for operation under a stream of nitrogen. Heating was ensured by immersion in a temperature-regulated oil bath.

A copolyamide containing 50% by weight of each of the following two polyamides was prepared: hexamethylenediamine/dimeric acid and BHMTA/dimeric acid.

577.6 g of dimeric acid, 61.87 g of hexamethylenediamine and 102.17 g of bis-hexamethylenetriamine, purified by distillation, were introduced into the reactor. The reactor was purged under nitrogen and immersed in the bath at 90° C. The mixture was stirred and the temperature was raised to 200° C. over the course of 1 hour. Same was maintained at 200° for 3 hours, under stirring. The resulting polymer was drawn off under a slight nitrogen pressure; it was very slightly yellow-colored and possessed the following characteristics:

| | |
|---|---|
| Tg by thermomechanical analysis: | −14° C. |
| Inherent viscosity: | 0.833 dl/g |
| Proportion of amide groups per 100 g: | 0.285 |
| Torsional modulus at 20° C.: | 32 DaN/mm² |

When heated to 260° C. on a heating plate or in a stirred reactor, this polymer cross-linked with itself in a few minutes to give an infusible compound.

The preparation of this polyamide made it possible to determine the characteristics of the polyamide which is to be used as the reinforcing phase in Example 9.

EXAMPLE 6

Preparation of a mixed phase of the polyamide based on hexamethylenediamine and dimeric acid, and of a copolymer of ethylene and acrylic derivatives:

A 50/50 by weight mixture of the polyamide obtained from hexamethylenediamine and dimeric acid, in accordance with Example 1, and a copolymer obtained from ethylene, methacrylic acid and methacrylic ester (marketed under the name Lupolen A 2910 MX) was prepared using a single-screw extruder (screw diameter D:

25 mm, length: 20 D) equipped with a proportioning pump.

The reaction was carried out at 175°–180° C. The mixture, extruded in rod form, was very flexible and elastic and whitened on drawing.

Proportion of amide groups per 100 g=0.153.

EXAMPLE 7

A mixture consisting of 80 parts by weight of polyhexamethylene adipamide, as described above (used as the matrix), and 20 parts by weight of the polyamide obtained in accordance with Example 1, containing carboxyl end groups, was introduced into a device which comprised a screw driven with a rotary and reciprocating movement, of the BUSS type, and which was heated to a temperature of 280° C.

The output of the apparatus was 8 kg/hour and the residence time of the polymer mixture was about 3 to 4 minutes.

The aforesaid yielded a polymer mixture, the CHARPY notch impact strength of which was determined. A strength of 0.95 J/cm$^2$ was found; in comparison, the polyamide alone, used as the matrix, has a CHARPY notch impact strength of 0.56 J/cm$^2$; a significant improvement was observed.

EXAMPLE 8

A mixture consisting of 80 parts by weight of polyhexamethylene adipamide, as described above (used as the matrix), and 20 parts by weight of the polyamide obtained in accordance with Example 4, containing carboxyl end groups, was introduced into a device which comprised a screw driven with a rotary and reciprocating movement, of the BUSS type, and which was heated to a temperature of 280° C.

The output of the apparatus was 8 kg/hour and the residence time of the polymer mixture was about 3 to 4 minutes.

The resulting composition possessed improved properties, mainly with respect to the CHARPY notch impact strength.

EXAMPLE 9

The procedure outlined in Example 8 was followed, but 20 parts of the polyamide mixture prepared in Example 5 were used. The composition possessed the following properties: $\Delta=33°$ C. tg $\alpha=83$.

Particle size between 0.1 and 1 micron.

EXAMPLE 10

A mixture consisting of 80 parts by weight of polyhexamethylene adipamide, as described above (used as the matrix), and 20 parts of the mixture of the polyamide and the copolymer of ethylene and acrylic derivatives, as outlined in Example 6, was introduced into a single-screw extruder of which the screw diameter D was 25 mm and the length was 20 D, and which was equipped with a proportioning pump and heated to 275° C.

The mixture was extruded in rod form and then converted to granules. The product obtained under these conditions was compact, whereas the mixture of polyhexamethylene adipamide (80 parts by weight) and the copolymer of ethylene and acrylic derivatives (20 parts by weight), prepared under analogous conditions, provided a mixture which was in the form of a rod containing a greater or lesser number of gas cavities because of the thermal degradation of the ethylenic copolymer.

The composition according to the invention possessed the following properties: $\Delta=35°$ C. tg $\alpha=80$. Particle size between 0.1 and 1 micron. After stabilization for 1 hour at 100° C.-notch impact strength 1.406±0.06 J/cm$^2$ and flexural modulus 196.50±3.22 DaN/mm$^2$.

EXAMPLES 11 and 12

280 g of polycaprolactam (matrix) and 120 g of the polyamide of dimeric acid prepared in Example 1, both in granule form, were introduced, at ambient temperature, into a stainless steel autoclave of 1 liter capacity.

After the equipment had been purged with nitrogen, the temperature of the reaction mass inside the autoclave was raised to 200° C. over the course of 35 minutes.

Heating was continued and, when the temperature reached a minimum of 250° C., stirring was commenced at 5 rpm. The temperature was raised to 270° C. over the course of 1 hour. Stirring was continued for an additional 4 hours at 270° C. The molten mixture was then drawn off under nitrogen pressure and collected in water in the form of a rod of about 2 mm diameter, which was converted to granules.

On analyzing this mixture by differential microcalorimetry, it was noted that the composite material had the two crystalline melting points characteristic of the starting constitutents. Furthermore, it was also found that the mixture did not change to a significant extent for a homogenization time which varied from 10 to 240 minutes at a temperature of 270° C.

Exactly the same experiment was repeated, but 360 g of polycaprolactam and 40 g of the polymer prepared in Example 1 were used.

The properties of the resulting mixtures are reported in the following table.

EXAMPLE 13

The procedure indicated in Example 10 was followed, 600 g of polycaprolactam (matrix) and 66.6 g of the polyamide prepared in accordance with Example 2 being used. After the equipment had been purged with nitrogen, the temperature of the mass was raised to 270° C. over the course of 1 hour, under stirring at 10 rpm. The mixture was subsequently stirred for 3 hours at 270° C. and the mixture was then collected, as above, in the form of a rod, which was converted to granules.

On analyzing the mixture by differential microcalorimetry, it was noted that the two polyamides employed at the beginning remained well individualized, the overall size of the dispersed particles being between 0.1 and 1µ. The properties of the resulting mixture are reported in the following table.

EXAMPLES 14 to 17

The following four examples were carried out in accordance with the first modified embodiment of the process for the preparation of compositions according to the invention, as heretofore described on page fourteen. This process consisted of introducing the polyamide corresponding to the flexible disperse phase into a prepolyamide. The prepolyamide used, the inherent viscosity of which was on the order of 0.9 to 0.95 dl/g, corresponded to the product obtained upon completion of decompression in a conventional cycle for the polycondensation of hexamethylenediamine adipate.

A 50% strength aqueous solution of hexamethylenediamine adipate and about 1.80 g of a 10% strength aqueous solution of acetic acid were introduced into a 1 liter stainless steel autoclave. The temperature of the reaction mass was raised to 220° C., under stirring, and this corresponded to an autogenous steam pressure of 18 bars. The water was then distilled over the course of 1 hour 30 minutes, under 18 bars, the temperature of the reaction mass being raised to 260° C. Decompression was then carried out slowly over the course of 1 hour 30 minutes, while at the same time raising the temperature of the reaction mass to 275° C. The desired amount of the selected polyamide of high molecular weight was then introduced into the autoclave and stirring was continued for 1 hour at 260° C. in order to homogenize the mixture. This mixture was finally drawn off under nitrogen pressure and transferred into water.

The properties of the resulting mixtures are reported in the following Tables I and II.

A marked decrease in the supercooling ($\Delta$) and an increase in tg $\alpha$, relative to the polyhexamethylenediamine matrix, will be noted.

In Example 14, 800 g of a 50% strength aqueous solution of hexamethylenediamine adipate and 86 g of the polyamide prepared in Example 1 were introduced.

In Example 15, 800 g of a 50% strength aqueous solution of hexamethylenediamine adipate and 38 g of the polyamide prepared in Example 1 were introduced.

In Example 16, 800 g of a 50% strength aqueous solution of hexamethylenediamine adipate and 86 g of the polyamide prepared in Example 2 were introduced.

In Example 17, 800 g of a 50% aqueous solution of hexamethylenediamine adipate and 86 g of the polyamide prepared in Example 3 were introduced.

TABLE I

| EXAMPLE | NATURE OF THE MATRIX AND PERCENTAGE | NATURE OF THE REINFORCING PHASE ACCORDING TO EXAMPLE | $\Delta =$ Mp − CpC |
|---|---|---|---|
| | A: polyhexamethylene adipamide 100% | — | 50° C. |
| | B: polycaprolactam 100% | — | 52° C. |
| 11 | B 70% | Example 1 30% | 43° C. |
| 12 | B 90% | Example 1 10% | 33° C. |
| 13 | B 90% | Example 2 10% | 34° C. |
| 14 | Prepolymer A 80% | Example 1 20% | 32° C. |
| 15 | Prepolymer A 90% | Example 1 10% | 32° C. |
| 16 | Prepolymer A 80% | Example 2 20% | 33° C. |
| 17 | Prepolymer A 80% | Example 3 20% | 33° C. |

TABLE II

| EXAMPLE | tg $\alpha$ | IMPACT STRENGTH in J/cm$^2$ | FLEXURAL MODULUS in DaN/mm$^2$ | SIZE OF THE DISPERSED PARTICLES |
|---|---|---|---|---|
| | 17 | 0.56 ± 0.05 | 240 ± 20 | — |
| | 28.5 | 0.616 ± 0.04 | 248 ± 8 | — |
| 11 | 52.5 | — | 168 ± 9 | 0.1 to 1$\mu$ |
| 12 | 71.4 | 0.607 ± 0.04 | 216 ± 4.7 | " |
| 13 | 105 | 1.20 ± 0.02 | 217 ± 5 | " |
| 14 | 33 | 0.86 ± 0.1 | 224 ± 7 | " |
| 15 | 47.5 | 0.70 ± 0.06 | 231 ± 8 | " |
| 16 | 63 | 0.91 ± 0.1 | 218 ± 13 | " |
| 17 | 52.5 | 0.98 ± 0.1 | 191.5 ± 6 | " |

These two measurements were carried out after stabilization for one hour at 100° C.

EXAMPLE 18

This is an example of the second modified embodiment of the process according to the invention. The salt obtained by reacting a dimeric diamine (VERSAMINE 52, from General Mills Chemical Inc.), having an amine number of 195–205 and an iodine number of 10–20, with a mixture of acids, one of which was essentially a dimeric diacid marketed under the name Empol 1010 (see Example 1 above) and the other of which was essentially a trimeric diacid consisting of about 90% by weight of trimeric acid having about 54 carbon atoms, and about 10% by weight of dimeric acid, this product being marketed by Unilever Emery under the name Empol 1041, was prepared.

120.68 g of dimeric diamine, 21.14 g of trimeric diacid (Empol 1041), 108.17 g of dimeric diacid (Empol 1010) and 250 g of perchloroethylene were introduced into a stirred 1 liter reactor equipped for operation under a nitrogen atmosphere.

The mixture was maintained at ambient temperature for one hour, under stirring. The reaction mass became homogeneous very rapidly after the reactants had been introduced.

The polycondensation of this salt was then carried out in the presence of hexamethylenediamine adipate.

393 g of dry hexamethylenediamine adipate, 200 g of distilled water, 169.5 g of a 50% strength solution, in perchloroethylene, of the salt prepared as indicated above, 0.18 g of acetic acid and about 1 ml of an antifoam agent at a concentration of 0.6% in perchloroethylene, were introduced into a 1 liter stainless steel autoclave equipped for operation under pressure.

After several purges with nitrogen under pressure, stirring was commenced and the perchloroethylene was distilled under atmospheric pressure by raising the temperature of the reaction mass to 175° C. The distillation was then terminated and the mixture was heated to 235° C. The autogenous steam pressure reached 18 bars. Still under this pressure, the steam was then distilled by raising the temperature to 260° C. Decompression was then carried out over the course of 90 minutes, the temperature being raised to 275° C. The reaction was completed by heating for 15 minutes under a stream of nitrogen at 275° C.

The composition thus obtained was extruded into water, under nitrogen pressure, and converted to granules.

The resulting composition had the following properties:

| | |
|---|---|
| Mp | 258° C. |
| CpC | 215° C. |
| $\Delta =$ | 43° C. |
| tg $\alpha =$ | 81 |

EXAMPLE 19

An example of the final modified embodiment of the process according to the invention is given by carrying out the polycondensation of caprolactam containing, in solution, the polyamide obtained in accordance with Example 1, in the presence of aminocaproic acid.

The reaction was carried out in a stirred 100 cm$^3$ glass reactor which was equipped for operation in vacuo and which was heated by a temperature-regulated alloy bath.

20 g of caprolactam, 5 g of the polyamide according to Example 1 ($\eta$inh.=0.864) and 3 g of 6-aminohexan-1-oic acid were introduced into the reactor at ambient temperature. After several purges with nitrogen, the reactor was immersed in the heating bath, regulated at 140° C. The mixture was stirred and the temperature was increased. At about 180° C., the mass became homogeneous due to dissolution of the polyamide in the caprolactam and the oligomers of the latter. The uniform temperature increase was continued. At about 210° C., it was noted that the reaction mass became heterogeneous. The temperature reached 270° C. after a reaction time of 2 hours. The mass was then heterogeneous and turbid and its viscosity increased rapidly. The temperature was maintained at 270° C. for 15 minutes and a vacuum of 1 mm of mercury was then established over the course of about 30 minutes in order to remove the free unreacted caprolactam. The mixture was maintained vacuo at 270° C. for 20 minutes. The polymer obtained upon completion of the reaction was turbid and possessed the following characteristics:

| | |
|---|---|
| Mp | 220° C. |
| CpC | 181° C. |
| Δ = | 39° C. |
| tg α = | 44.4 |

This result evidenced that the polyamide prepared in accordance with Example 1 was indeed dispersed in the polycaprolactam in the absence of any significant chemical interaction between the polyamides employed.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A heat-stable polyphase polyamido composition of matter having enhanced mechanical properties, comprising (i) from 55 to 99% by weight of a nylon polyamide resin matrix, the polyamide resin matrix having a number-average molecular weight of at least 5,000, and (ii) from 1 to 45% by weight of a particulate disperse phase comprising a polyamide sufficiently incompatible with the polyamide resin matrix to provide a polyphase composition, the particulates having a particle size ranging from 0.01 to 10 microns, and the disperse phase comprising a polyamide having a content in amide groups of less than 40% of the amide groups comprising said polyamide matrix resin and the disperse phase having a glass transition temperature of less than 5° C.

2. The composition of matter as defined by claim 1, comprising from 70 to 90% by weight of the matrix (i), the polyamide resin having a number-average molecular weight in excess of 10,000, from 10 to 30% by weight of the disperse phase (ii) comprising particulates having a particle size ranging from 0.05 to 3μ, and said polyamide having a glass transition temperature below −10° C.

3. The composition of matter as defined by claim 1, the polyamide matrix resin being polycaprolactam or polyhexamethylene adipamide.

4. The composition of matter as defined by claim 1, the disperse phase comprising a polyamide prepared from a dimeric acid.

5. The composition of matter as defined by claim 4, the dimeric acid containing at least 36 carbon atoms.

6. The composition of matter as defined by claim 1, the disperse phase comprising a polyamide prepared from a dimeric diamine.

7. The composition of matter as defined by claim 6, the dimeric diamine containing at least 36 carbon atoms.

8. The composition of matter as defined by claim 4, the disperse phase comprising a polyamide prepared from a polyamine comprising an ether group and at least 8 carbon atoms.

9. The composition of matter as defined by claim 4, the disperse phase comprising a polyamide prepared from a secondary bis-primary polyamine.

10. The composition of matter as defined by claim 9, the secondary bis-primary polyamine being bis-hexamethylene triamine.

11. The composition of matter as defined by claim 6, the disperse phase comprising a polyamide prepared from a mixture of a dimeric diamine and a second bis-primary polyamine.

12. The composition of matter as defined by claim 11, the disperse phase comprising a polyamide prepared from a mixture of a dimeric diamine containing at least 36 carbon atoms and bishexamethylenetriamine.

13. The composition of matter as defined by claim 4, the disperse phase comprising a polyamide prepared from a mixture of a dimeric acid and a polyacid having at least 3 functional groups.

14. The composition of matter as defined by claim 13, said polyacid being a trimeric acid.

15. The composition of matter as defined by claim 1, the disperse phase comprising a mixture of a polyamide and a statistical, block or graft copolymer derived from an unsaturated or polyunsaturated monomer containing groups which are reactive toward the polyamide in an amount ranging from 0.5 to 10 mol %, the groups being selected from the group consisting of acid, amino, anhydride, sulphonated and amido groups.

16. The composition of matter as defined by claim 15, the copolymer derived from an unsaturated monomer being a copolymer of ethylene, methacrylic acid or methacrylic esters.

17. A process for the preparation of the composition of matter as defined by claim 1 comprising subjecting a mixture of the polyamide matrix resin and disperse phase polyamide, the polyamide matrix resin and the disperse phase polyamide having a number-average molecular weight in excess of 5,000, to shearing conditions, in a closed system and at a temperature above the melting point of the polyamide matrix resin, sufficient to disperse the disperse phase polyamide in the polyamide matrix resin in the form of particles having a size ranging from 0.01 to 10 microns.

18. The process of claim 17 wherein the number-average molecular weight of the polyamide matrix resin is in excess of 10,000, and the number-average molecular weight of the disperse phase polyamide is in excess of 15,000.

19. The process of claim 17 wherein polycondensation of the polyamide matrix resin, same initially having a number-average molecular weight in excess of 2,000, is completed conjointly with the dispersion of the disperse phase polyamide, in a system equipped for degassing.

20. The process of claim 19 wherein polycondensation of the polyamide matrix resin and the disperse phase polyamide is carried out simultaneously with the dispersion of the disperse phase polyamide.

21. The process of claim 17 wherein polycondensation of the polyamide matrix resin is carried out conjointly with the dispersion of the disperse phase, which is carried out under shear conditions sufficient to result in the disperse phase being dispersed in the form of particles having a size ranging from 0.01 to 10 microns upon polycondensation of the polyamide matrix resin.

22. A shaped article comprising the composition of matter as defined by claim 1.

* * * * *